United States Patent
Pritikin

(10) Patent No.: US 7,865,729 B2
(45) Date of Patent: Jan. 4, 2011

(54) BIDIRECTIONAL AUTHENTICATION FOR HTML FORM PROCESSING

(75) Inventor: Max C. Pritikin, Madison, WI (US)

(73) Assignee: Cisco Technology, Inc., San Jose, CA (US)

( * ) Notice: Subject to any disclaimer, the term of this patent is extended or adjusted under 35 U.S.C. 154(b) by 1115 days.

(21) Appl. No.: 11/537,837

(22) Filed: Oct. 2, 2006

(65) Prior Publication Data

US 2008/0082821 A1  Apr. 3, 2008

(51) Int. Cl.
*H04L 9/32* (2006.01)
*G08B 9/00* (2006.01)
*G06Q 20/00* (2006.01)

(52) U.S. Cl. .................. 713/169; 726/22; 726/28; 705/70

(58) Field of Classification Search .................. 713/169; 726/22, 28; 705/70
See application file for complete search history.

(56) References Cited

U.S. PATENT DOCUMENTS

| | | | | |
|---|---|---|---|---|
| 6,058,476 | A * | 5/2000 | Matsuzaki et al. | 713/169 |
| 6,134,661 | A * | 10/2000 | Topp | 726/18 |
| 6,161,005 | A * | 12/2000 | Pinzon | 455/403 |
| 6,490,579 | B1 * | 12/2002 | Gao et al. | 1/1 |
| 2003/0014368 | A1 * | 1/2003 | Leurig et al. | 705/64 |
| 2005/0187956 | A1 * | 8/2005 | Sylvester et al. | 707/101 |
| 2006/0021031 | A1 * | 1/2006 | Leahy et al. | 726/22 |
| 2006/0236387 | A1 * | 10/2006 | Ballinger et al. | 726/14 |
| 2006/0253446 | A1 * | 11/2006 | Leong et al. | 707/9 |
| 2007/0027895 | A1 * | 2/2007 | Bridges et al. | 707/102 |
| 2007/0106665 | A1 * | 5/2007 | Nurmi | 707/6 |

* cited by examiner

*Primary Examiner*—Kambiz Zand
*Assistant Examiner*—Michael Guirguis
(74) *Attorney, Agent, or Firm*—Patterson & Sheridan, LLP

(57) ABSTRACT

A method of posting HTML form data securely is provided. Some embodiments may use an existing security protocol to send the sensitive information as an encrypted challenge from a client to a server, while other embodiments may require a bidirectionally-authenticated tunnel to be created before sensitive data is transmitted. The browser displaying the HTML form may employ user interface elements, such as graphical images and/or display messages, that actively notify the user when the webpage form is not secure via bidirectional authentication.

18 Claims, 5 Drawing Sheets

BIDIRECTIONAL AUTHENTICATION FOR HTML FORM PROCESSING

BACKGROUND OF THE INVENTION

1. Field of the Invention

Embodiments of the present invention generally relate to the field of network communication, and more particularly, to security and authentication of network communications when transmitting sensitive information entered via webpage forms.

2. Description of the Related Art

For the vast majority of network communications (e.g., the internet), unsecured transmission is acceptable. However, information transmitted according to the Transmission Control Protocol/Internet Protocol (TCP/IP) is vulnerable to eavesdropping and tampering. Systems connected to the internet may intercept, replay, or reproduce an IP packet. Thus, more sensitive information such as financial transactions, medical records, and confidential company business requires secure transmissions. In response to the desire for secure network communications, a standard for security protocol known as the Secure Sockets Layer (SSL) was developed by Netscape Communication Corporation.

SSL is an enhancement to the TCP/IP standards of network protocol for secure communication between two devices. To establish a secure connection where user authentication is required—such as logging into a bank's website for financial transactions—a user is typically required to enter a username and a password into an HTML (hypertext markup language) form on an SSL-protected webpage viewed through a browser on a network client. The client may establish a secure TCP/IP connection to the server on a special port (e.g., 443, as opposed to the default web port 80).

After this connection is established, the client and server exchange handshake messages that ascertain the method for data transfer and the exchange of keys between the two devices. Once a pair of keys is exchanged, the client and server may send the HTML form data and other information as authenticated and encrypted data over that particular connection.

As those skilled in the art will recognize, however, only the server is typically authenticated according to SSL protocol, while the client's identity is not ensured (i.e., the client remains unauthenticated). Client-side digital certificates are not required by most web applications due to complexity, cost, logistics and effectiveness issues. In addition, the password, credit card number, social security number, or other such sensitive information is essentially presented to the server as clear text data, even though it is transmitted according to SSL protocol.

These flaws allow for so-called man-in-the-middle attacks as illustrated in FIG. 1 where an attacker 102 may be able to read, insert and modify messages between a client 104 and a bank server 106 at will without either party knowing that the supposedly secure connection between them has been compromised. Trusting that the connection was secure, a user may have entered a personal username 108 and password 110 into an HTML form 112 displayed on a web browser 114 and logged into what the user believes to be his or her financial institution. However, the attacker 102 may have intercepted the transmission and acquired the username 108 and password 110. Because the outer SSL connection does not authenticate the client 104, the bank server 106 has no way of verifying the client 104 properly established a secure communication stream between the bank server 106 and the client browser 114. Thus, it may be a simple matter for the attacker 102 to then log into the bank server 106 and withdraw money from the user's bank account. The attacker 102 can also create fake accounts in the user's name, ruin a user's credit or even prevent the user from accessing his or her own accounts.

In an effort to mitigate these problems, a number of improvements have been attempted including bidirectional authentication and the use of a SiteKey. Bidirectional authentication, also known as mutual authentication or two-way authentication, refers not only to a server authenticating itself to a client, but also to a client or user authenticating itself to a server in such a manner that the identity of both parties is ensured. This is typically accomplished without interaction from the user. Bidirectional SSL provides the same features as conventional SSL with the addition of authentication and non-repudiation of the client, thereby preventing attackers from successfully impersonating customers to financial institutions in order to conduct fraudulent transactions. However, there is currently no method to alert a user entering sensitive information into an HTML form whether bidirectional authentication will be utilized to post the form data or whether the user's password, social security number, credit card information, and the like will be transmitted securely.

The second attempted improvement mentioned is the use of a SiteKey, implemented by Bank of America Corporation. While logging into the Bank of America website and after entering an Online ID, the browser displays a user's personal SiteKey if the bank server recognizes the client computer. The SiteKey is an image pre-selected by the user to inform him or her that the user is connected to the valid Bank of America website and may then safely transmit the user's Passcode (password). If the bank server does not recognize the client computer, then the server asks a challenge question pre-selected by the user that he or she must respond to with the same answer used during the initial SiteKey configuration. This type of recognition of the client by the server helps prevent attacks on the server.

Moreover, the proper use of the SiteKey should prevent the type of man-in-the-middle attack called phishing, or more specifically pharming, where a user is unknowingly redirected to a fraudulent website containing portions copied from the legitimate website. Since the fraudulent website's pages look familiar, users may be tricked into inputting and submitting sensitive information to an attacker that can subsequently exploit this information. An incorrect or missing SiteKey should caution the user that they have reached a fraudulent website, but does not prevent the user from entering sensitive information into an HTML form and transmitting it to an attacker if the user is not paying attention or does not understand that a phishing attack is occurring. Thus, the passive SiteKey method relies on user training and vigilance during logins.

Accordingly, what is needed is a method of securely posting HTML form data involving sensitive information (e.g., passwords, credit card numbers and social security numbers) that actively alerts a user when insecure posting is attempted.

SUMMARY OF THE INVENTION

One embodiment of the invention is a method of posting sensitive information on a webpage form to a server. The method generally includes establishing a bidirectionally-authenticated connection between a client and the server; displaying a notification that the connection has been bidirectionally-authenticated; entering the sensitive information into one or more entry fields of the webpage form; and transmitting the sensitive information to the server.

Another embodiment of the invention is a method of posting sensitive information on a webpage form to a server. The method generally includes displaying a notification that a bidirectionally-authenticated connection between a client and the server will be used based on the presence of one or more entry fields of the webpage form requiring the posting of sensitive information; entering the sensitive information into the one or more entry fields; and transmitting the sensitive information to the server along the bidirectionally-authenticated connection.

Yet another embodiment of the invention provides for a web browser for assisting an operator in posting sensitive information on a webpage form to a server. The web browser generally includes a viewing area to display a running web application having the webpage form and a security indication to notify an operator viewing the web browser whether a bidirectionally-authenticated connection will be implemented, has been established, and/or is being maintained.

Yet another embodiment of the invention is a method of posting sensitive information on a webpage form to a server. The method generally includes entering a corresponding portion of the sensitive information into at least one designated entry field for authentication; performing bidirectional authentication of a client and the server using the corresponding portion of the sensitive information entered into the at least one designated entry field; and transmitting a remaining portion of the sensitive information to the server.

Yet another embodiment of the invention provides for a software application. The software application generally includes interface means for displaying a web application having a webpage form and for entering sensitive information into one or more entry fields of the webpage form and notification means for revealing whether a bidirectionally-authenticated connection will be implemented, has been established, and/or is being maintained.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide a method of posting HTML form data securely. Some embodiments may use an existing security protocol to send the sensitive information as an encrypted challenge from a client to a server, while other embodiments may require a bidirectionally-authenticated tunnel to be created before sensitive data is transmitted. The browser displaying the HTML form may employ user interface elements, such as graphical images and/or display messages, that actively notify the user when the webpage form is not secure via bidirectional authentication.

For the detailed description of techniques for secure posting of HTML form data that follows, examples are provided that are meant to facilitate understanding and illustrate, but not limit, aspects of the present invention. For example, even though various types of information in an HTML form may be securely posted, the posting of sensitive information (e.g., passwords, credit card numbers and social security numbers) is described herein. Furthermore, various operations for bidirectional authentication described herein may be modified, performed in different order, removed, and others added, while still adhering to the scope of the invention.

An Exemplary Posting of HTML Form Data

Figure 1:
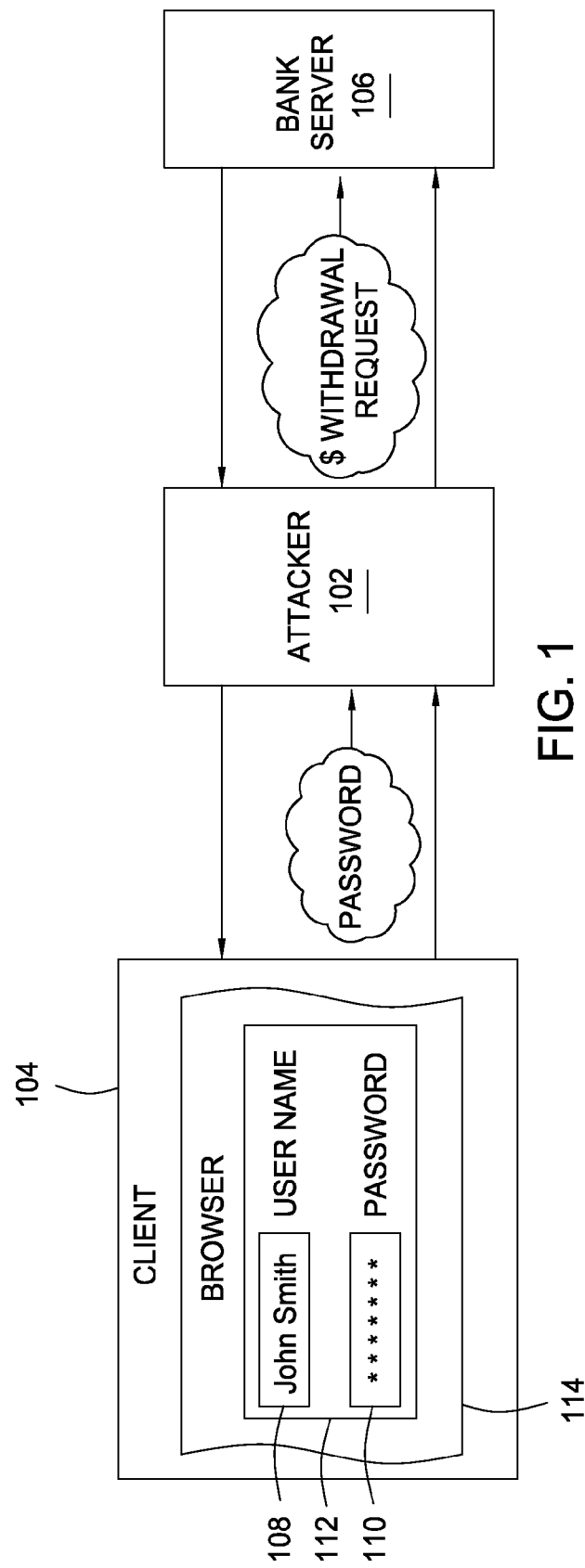
FIG. 1 is a prior art block diagram of a man-in-the-middle attack on an online banking session between a client and a bank server.
Figure 2A:
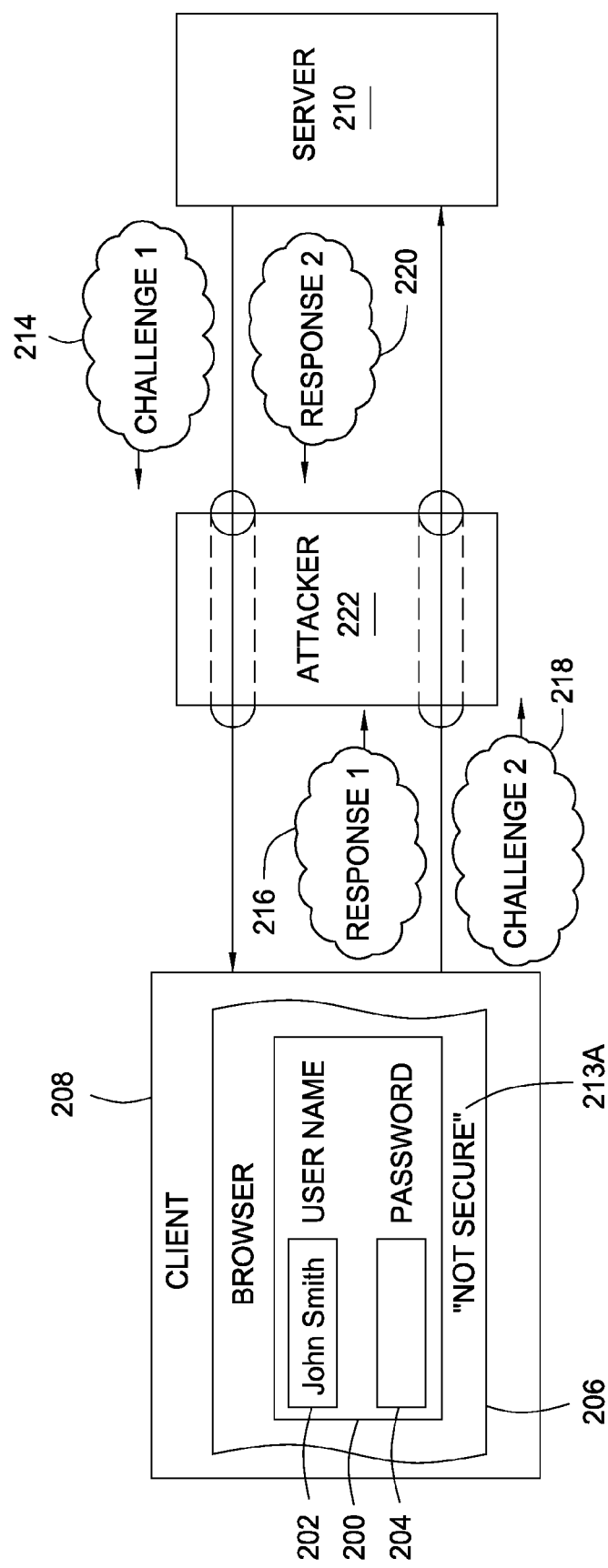
FIG. 2A is a block diagram of bidirectional authentication in network communications between a client and a server before a browser displaying a webpage form acknowledges that it is secure according to embodiments of the invention.

Referring to FIG. 2A, a webpage form 200 in HTML may comprise a username entry field 202 and a password entry field 204 and may be displayed on a web browser 206 running on a client 208. The webpage form 200 may comprise other types of sensitive information entry fields that may be in addition to or replace the password entry field 204, but for clarity in the specification, the password entry field 204 will be discussed. The presence of a password entry field 204 within the webpage form 200 may trigger the browser 206 that bidirectional authentication is required, and the browser 206 may display any suitable graphical image (not shown), such as an icon or a colored address bar, indicating that bidirectional authentication is supported and will be used for network communication.

Until authentication of both the client 208 and a server 210 has occurred or when authentication of either entity has failed, the browser 206 may display a message 213*a* warning a user (not shown) operating the client 208 that transmission of data entered in the webpage form 200 may not be secure. As an alternative, the browser image indicative of bidirectional authentication may change to denote insecure transmission. For example, an opened padlock icon may be displayed similar to the conventional icon for representing insecure SSL transmission. Because JavaScript can be used by an attacker 222 to simulate the browser image indicating whether the transmission is secure, the browser image or other suitable user interfaces serving the same purpose should extend beyond the boundaries of the screen real estate available to the running web application. In such a case, it should not be possible for an attacker 222 to have access to and replicate the area of the screen where properly placed images denoting secure/insecure transmission reside.

No matter how this indication of insecure transmission is performed, the client 208 may not be permitted to transmit data entered in the password entry field 204 to the server 210 until bidirectional authentication has occurred and the transmission remains secure. In such cases, the user may enter data for all of the fields in the webpage form 200 including the password entry field 204, but upon user submission, at least the content of sensitive information entry fields should not be transmitted until successful bidirectional authentication has been completed. For some embodiments, in fact, the user may not even be allowed to enter text in the password entry field 204 until bidirectional authentication has occurred or while the transmission is deemed insecure. The password entry field may be grayed out to signify this to the user. Therefore, even if an attacker 222 is eavesdropping on the network communication, no sensitive information may have been transmitted for the attacker 222 to intercept. For other embodiments, when the transmission is deemed insecure, the user may be allowed to enter text in the password entry field 204 and submit the information as encrypted data, but the receiving server 210 should not be provided with the decryption keys.

Bidirectional authentication may be initiated when the server 210 creates and sends a first challenge 214 to the client 208. In network security, a challenge is normally a question provided by one network entity, such as an authentication server or a wireless access point, in an effort to ascertain the identity of a second network entity, such as a client computer. A valid response to the challenge, which is typically a random number, is usually expected in order to authenticate the second network entity.

The client 208 may use a secret key to encrypt the first challenge via an encryption algorithm and may send a first response 216 back to the server 210. The server 210 may perform the same encryption algorithm on the first challenge 214 and may compare the result to the first response 216. If the first response 216 matches the encrypted first challenge, then the client 208 has been authenticated. For server authentication, the client 208 may issue a second challenge 218, and the server 210 may respond with a second response 220 in a similar manner as heretofore described. The order of client and server authentication may be reversed without changing the end result of bidirectional authentication.

Figure 2B:
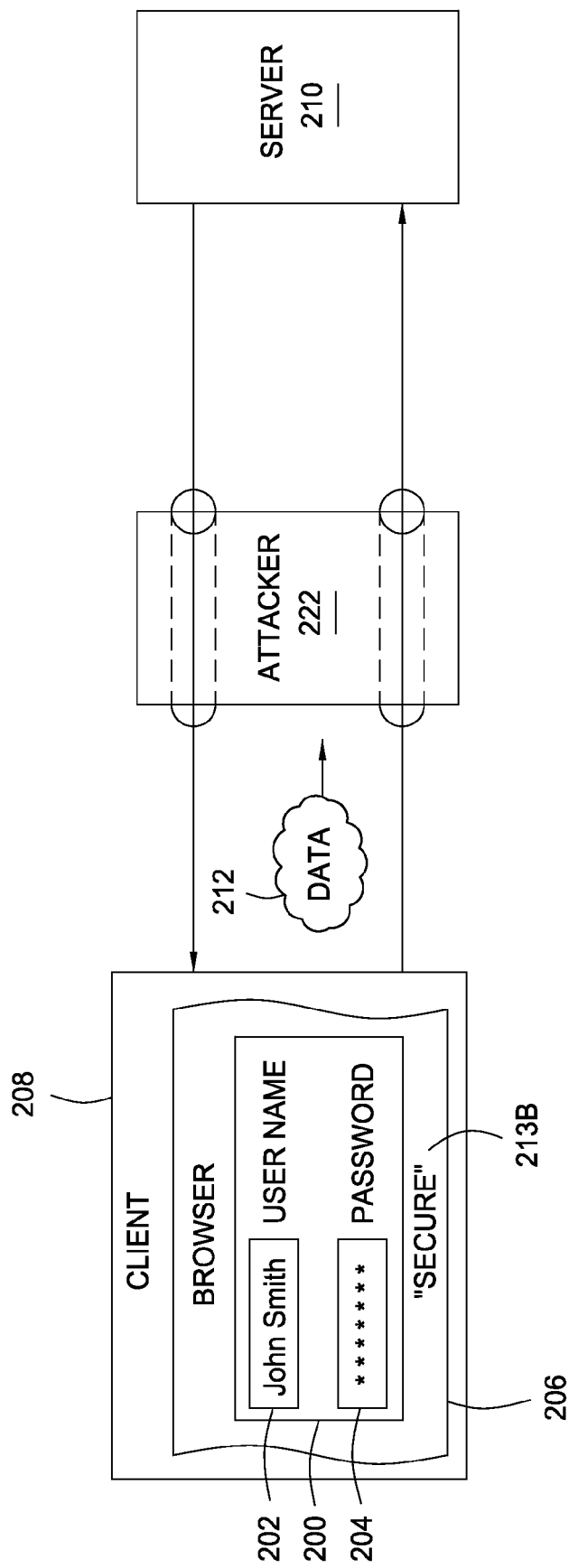
FIG. 2B is a block diagram of data entered into the webpage form being posted after bidirectional authentication has occurred, the browser has acknowledged that it is secure, and the operator has completed the form according to embodiments of the invention.

As illustrated in FIG. 2B, once both the client 208 and the server 210 have been authenticated, the browser 206 may display a message 213b notifying the user that sensitive information may be safely entered in the webpage form 200 and transmitted over a secure channel. As an alternative, the aforementioned browser image for bidirectional authentication may change to denote secure transmission. For example, a closed padlock icon may be displayed similar to the conventional icon for representing secure SSL transmission, or the address bar may change color. Such images may also be used in some embodiments to simply indicate to the user that the client 208 will only transmit sensitive webpage form data in a bidirectionally-authenticated fashion, whether authentication has previously occurred or not.

No matter how this indication of secure transmission is performed, the user may complete the remaining entry fields in the webpage form 200 including those with sensitive information and instruct the browser 206 to upload the webpage form 200. Data 212 from the webpage form 200 may then be encrypted and securely posted to the server 210. Because bidirectional authentication should have occurred before the sensitive information was transmitted, the user should rest assured that the client 208 is not transmitting this sensitive information directly to an attacker 222. Furthermore, the server 210 should recognize that the legitimate client 208 is trying to transmit information, rather than an attacker 222.

For some embodiments, it may be beneficial to develop standardized browser features to notify users when the webpage form 200 is secure for password entry or sending other sensitive information. Besides the icons or colored address bars already mentioned, some embodiments may relate the curtain text of the password entry field 204 to the presence of a secure bidirectionally-authenticated connection between the client 208 and the server 210. Curtain text may be any suitable symbol, such as an asterisk, that replaces text in an effort to mask it from other observers as it is being typed.

Figure 3B:
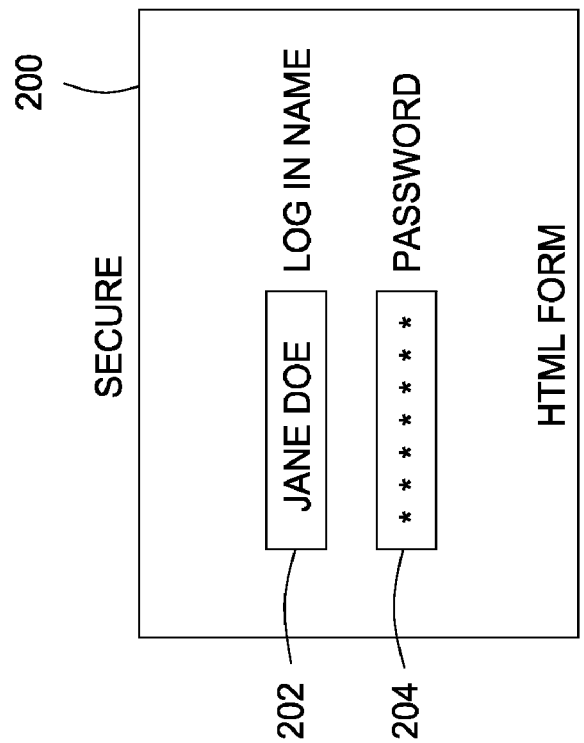
FIG. 3B is an example of a web browser visual cue denoting that bidirectional authentication has occurred and security has been maintained while entering a password into a webpage form prior to posting the password according to embodiments of the invention.
Figure 3A:
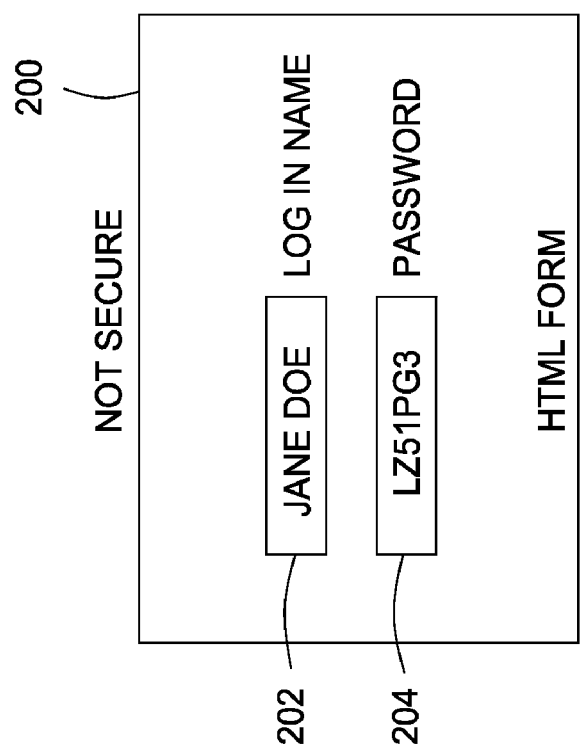
FIG. 3A is an example of a web browser visual cue denoting that bidirectional authentication has not occurred and security has not been maintained while entering a password into a webpage form prior to posting the password according to embodiments of the invention.

When the webpage form 200 is not secure, the browser 206 may display the password exactly as it is typed into the password entry field 204 as shown in FIG. 3A. When the user can see his or her literal password, this may alert the user to stop entering the information into the webpage form 200. For example, if the user's password is "LZ51 PG3," then the user may halt his or her password entry after typing the first few characters, such as "LZ5," and seeing them displayed as "LZ5" in the password entry field 204. When the webpage form 200 is secure, the browser 206 may display the password with curtain text as shown in FIG. 3B.

Although this browser feature may be a useful visual cue to users, the presence or absence of curtain text may not be completely relied upon for indicating secure bidirectionally-authenticated transmission since an attacker may be able to simulate the browser image as described herein. Therefore, the presence of curtain text may be used for some embodiments in conjunction with an icon or other image outside the boundaries of the screen real estate available to the running web application.

Such embodiments of the invention that require bidirectional authentication before transmitting the contents of the password entry field 204 or other sensitive information may require a new bidirectionally secure protocol. SSL or its successor TLS (Transport Layer Security) may need to be extended to include a bidirectional authentication mechanism so that the posting of a webpage form 200 with sensitive information that requires this feature occurs within a bidirectionally-authenticated SSL or TLS tunnel. For some embodiments, an IP Security (IPsec) connection may be established between the client 208 and the server 210 instead of an SSL/TLS tunnel, using the previously shared password in the webpage form to authenticate the connection. Providing security at layer 3 of the Open Systems Interconnection Reference Model (OSI model), IPsec is a standard for securing IP communications by encrypting and/or authenticating all IP packets. Using IPsec may serve to insulate the developer on all levels from having to modify the existing HTML processing to account for the added bidirectional security.

Figure 4:
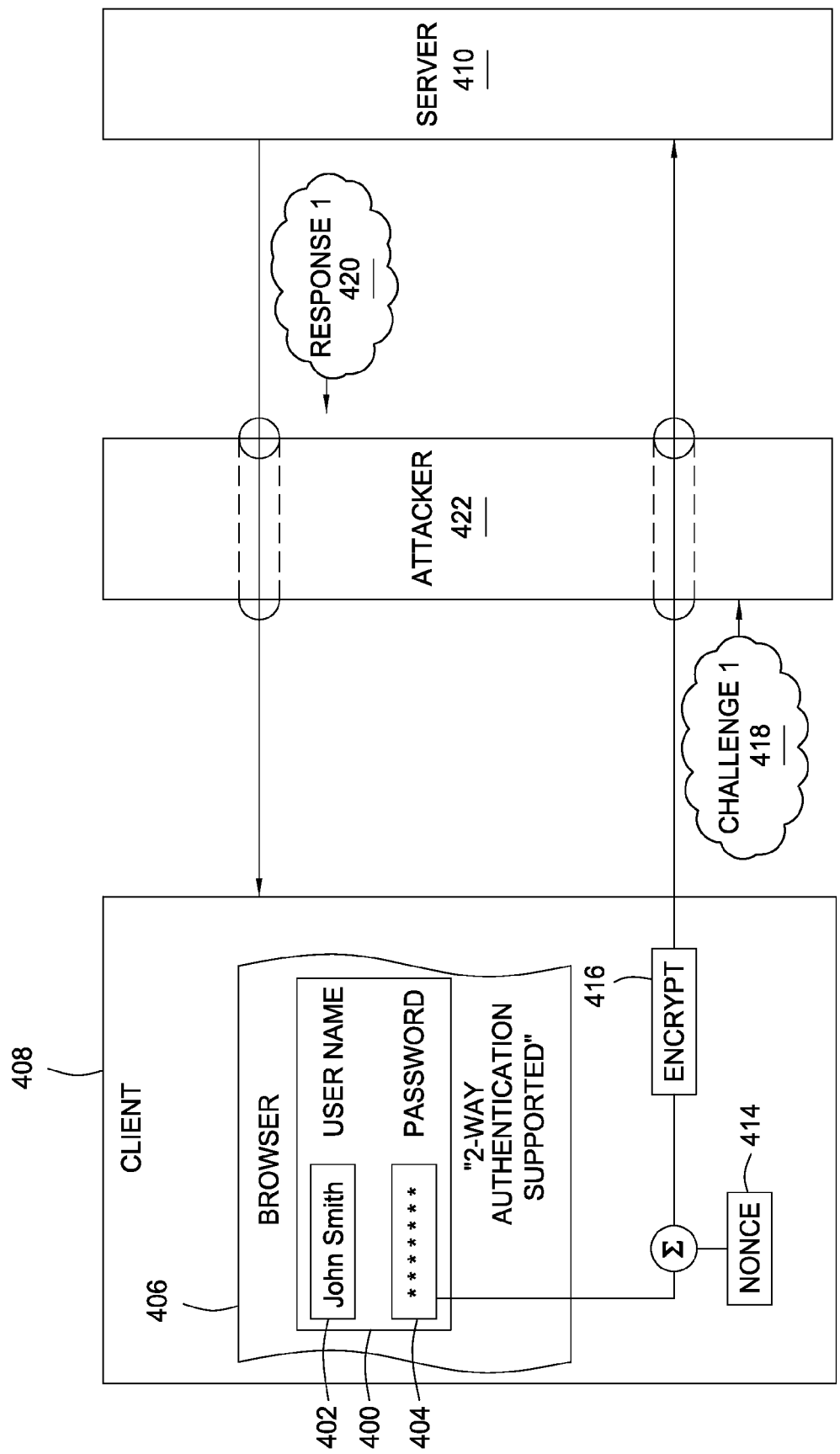
FIG. 4 is a block diagram of bidirectional authentication where the password within a webpage form is used as part of a challenge-response mechanism for bidirectional authentication according to embodiments of the invention.

Other embodiments of the invention may not require a special bidirectionally-secure protocol and may work within the existing SSL/TLS protocol as illustrated in FIG. 4. In this block diagram, a webpage form 400 in HTML may comprise a username entry field 402 and a password entry field 404 and may be displayed on a web browser 406 running on a client 408. Again, the webpage form 400 may comprise other types of sensitive information entry fields that may be in addition to or replace the password entry field 404. From a security point of view, the webpage form 400 may also contain additional insignificant entry fields (not shown).

The presence of a password entry field 404 within the webpage form 400 may trigger the browser 406 that bidirectional authentication is required, and the browser 406 may display any suitable graphical image (not shown), such as an icon or a colored address bar, indicating that bidirectional authentication is supported and will be implemented. The browser 406 may display a message with this support information as shown. When authentication of either the client 408 or a server 410 has failed, the browser 406 may display a message warning a user (not shown) operating the client 408 that transmission of data entered in the webpage form 400 may not be secure. As an alternative, the browser image for bidirectional authentication may change to denote insecure transmission. For example, an opened padlock icon may be displayed similar to the conventional icon for representing insecure SSL transmission.

When the username and password entry fields 402, 404 as part of a limited webpage form for initial posting have been entered and a request for submission has been made within the browser 406, the contents of the username entry field 402 may be posted directly, but the contents of the password entry field 404 should not be. For other embodiments, all or a substantial amount of the webpage form may be completed including the username and password entry fields, 402, 404, but the contents of the password entry field 404 should still not be posted directly upon user submission. Instead, the client 408 may add a nonce 414 (or other suitable bits to aid secure transmission) to the contents of the password entry field 404. A nonce literally stands for a "number used once" and is a random or pseudo-random number issued in an authentication protocol to ensure that old communications cannot be reused in so-called replay attacks.

The nonce 414 and password combination may be encrypted by some sort of encryption engine 416 and issued as a challenge 418 to the server 410. The server 410 may look up the username, decrypt the message with a secret key or a stored password for that username, and issue a response 420 so that the server 410 may be authenticated. This response 420 may be an encrypted version of the password/nonce combination with 1 added to the nonce before encryption. In this manner, the client 408 may recognize that the server 410 knows the correct password for that username, the nonce 414, and the encryption/decryption algorithm. An attacker 422 should not know all of this information, and therefore, should not be able to fool the client 408 into believing that the attacker 422 is a legitimate server 410.

For other embodiments, the server 410 may respond with a random key, the received nonce with 1 added, and a new nonce, and this response 420 may be encrypted with the client's supposed secret key. If the client 408 cannot decrypt the response 420, then the client 408 (or the browser 406 running on the client 408) may inform the user that the server authentication has failed. On the other hand, if the client 408 properly decrypts the response 420, then the client may send the remaining data in the webpage form 400 encrypted with the server's random key. If the server 410 fails to decrypt this data, then the server 410 may have detected an attacker 422 interfering with the transmission.

In such cases, the contents of the password entry field 404 may not even be transferred and read as a password by the server 410. Rather, the contents of the password entry field 404 may simply be used as part of the encrypted challenge 418 to the server 410 and transferred as cipher text. An attacker 422 may be eavesdropping on the transmissions, but the contents of the password entry field 404 should have been encrypted securely, and the password should only be used to authenticate the server 410. Such bidirectional authentication may ensure the identities of both the client 408 and the server 410, and these steps may be repeated for any of the other sensitive information entry fields and/or the insignificant entry fields in the webpage form 400 until all of the fields have been posted.

While the foregoing is directed to embodiments of the present invention, other and further embodiments of the invention may be devised without departing from the basic scope thereof, and the scope thereof is determined by the claims that follow.

The invention claimed is:

1. A method of posting information on a webpage form to a server, comprising:
    establishing a connection between a client and the server;
    utilizing a presence of one or more entry fields of the webpage form requiring a secure posting of information to notify the client that the connection needs to be bidirectionally-authenticated;
    displaying a notification to indicate the connection has been bidirectionally-authenticated wherein the client has been authenticated at the server and the server has been authenticated at the client;
    replacing the information with curtain text as the information is being entered into at least one of the entry fields to indicate the bidirectionally-authenticated connection has been established;
    displaying the information literally and without curtain text as the information is being entered into at least one of the entry fields to indicate the bidirectionally-authenticated connection has not been established; and
    allowing the posting of the information entered in the one or more entry fields of the webpage form only when displaying the notification.

2. The method of claim 1, wherein the notification comprises at least one of a message, a color change in an address bar, and an icon.

3. The method of claim 1, wherein the notification is displayed in a web browser outside of an area available to a running web application with the webpage form.

4. The method of claim 1, further comprising periodically checking to ensure the bidirectionally-authenticated connection is maintained.

5. The method of claim 4, further comprising changing the notification if the bidirectionally-authenticated connection is not maintained.

6. The method of claim 4, further comprising preventing transmission of the information to the server if the bidirectionally-authenticated connection is not maintained.

7. The method of claim 1, wherein the bidirectionally-authenticated connection is a Secure Sockets Layer (SSL) tunnel, a Transport Layer Security (TLS) tunnel, or an Internet Protocol Security (IPsec) connection.

8. The method of claim 1, wherein establishing a bidirectionally-authenticated connection comprises creating and sending a first random number challenge from the server to the client, encrypting the first challenge using a first secret key at the client, sending a first response from the client to the server, encrypting the first challenge at the server, comparing the encrypted first challenge to the first response to authenticate the client, and authenticating the server.

9. The method of claim 8, wherein authenticating the server comprises issuing a second random number challenge from the client to the server, decrypting the second challenge using a second secret key at the server, sending a second response from the server to the client, encrypting the second response at the client, and comparing the encrypted second response to the second challenge.

10. A method of posting information on a webpage form to a server, comprising:
    displaying a notification, in response to the presence of one or more entry fields of the webpage form requiring a secure posting of the information, that a bidirectionally-authenticated connection between a client and the server will be used;

prior to establishing a bidirectionally-authenticated connection, displaying the information literally and without curtain text as the information is being entered into at least one of the entry fields to indicate the bidirectionally-authenticated connection has not been established establishing the bidirectionally-authenticated connection after the information has been entered into the one or more entry fields replacing the information with curtain text as the information is being entered into at least one of the entry fields to indicate the bid irectionally-authenticated connection has been established; and transmitting at least the information to the server along the bidirectionally-authenticated connection.

11. The method of claim 10, wherein the notification is at least one of a message, a color change in an address bar, and an icon.

12. The method of claim 10, wherein the notification is displayed in a web browser outside of an area available to a running web application with the webpage form.

13. A non-transitory computer-readable medium containing a program for posting information on a webpage form to a server which, when executed by a processor, performs operations comprising:

establishing a connection between a client and the server;

utilizing the presence of the one or more entry fields of the webpage form requiring a secure posting of the information to notify the client that the bidirectionally-authenticated connection needs to be established;

displaying a notification to indicate the connection has been bidirectionally-authenticated wherein the client has been authenticated at the server and the server has been authenticated at the client replacing the information with curtain text as the information is being entered into at least one of the entry fields to indicate the bid irectionally-authenticated connection has been established displaying the information literally and without curtain text as the information is being entered into at least one of the entry fields to indicate the bidirectionally-authenticated connection has not been established; and allowing the posting of information entered in one or more entry fields of the webpage form only when displaying the notification.

14. The non-transitory computer-readable medium of claim 13, wherein the notification is at least one of a message, a color change in an address bar, and an icon.

15. A method of posting information on a webpage form to a server, the webpage form containing a plurality of entry fields, comprising:

indicating to a user that bidirectional authentication is supported and will be implemented;

entering a corresponding portion of the information into at least one designated entry field of the plurality of entry fields for authentication;

performing operations to bidirectionally authenticate a connection between a client and the server using the corresponding portion of the information entered into the at least one designated entry field, wherein performing bidirectional authentication comprises:

adding a nonce to the corresponding portion of the information entered into the at least one designated entry field to form a sum;

encrypting the sum to form a challenge; and issuing the challenge to the server;

replacing the information with curtain text as the information is being entered into at least one of the entry fields to indicate the bidirectionally-authenticated connection has been established; and displaying the information literally and without curtain text as the information is being entered into at least one of the entry fields to indicate the bidirectionally-authenticated connection has not been established.

16. The method of claim 15, wherein the at least one designated entry field is part of a limited webpage form presented to a user.

17. The method of claim 15, wherein the at least one designated entry field is a password entry field and the corresponding portion of the information is a password.

18. The method of claim 15, further comprising utilizing the presence of the at least one designated entry field of the webpage form to notify the client that bidirectional authentication will be performed.

* * * * *

UNITED STATES PATENT AND TRADEMARK OFFICE
CERTIFICATE OF CORRECTION

PATENT NO.       : 7,865,729 B2
APPLICATION NO.  : 11/537837
DATED            : January 4, 2011
INVENTOR(S)      : Pritikin It is certified that error appears in the above-identified patent and that said Letters Patent is hereby corrected as shown below:

Column 9, Claim 10, Line 11, please delete "bid irectionally-authenticated" and insert --bidirectionally-authenticated-- therefor;

Column 9, Claim 13, Line 38, please delete "bid irectionally-authenticated" and insert --bidirectionally-authenticated-- therefor.

Signed and Sealed this
Seventeenth Day of May, 2011

David J. Kappos
*Director of the United States Patent and Trademark Office*